United States Patent [19]

Jeskey

[11] Patent Number: 4,693,552
[45] Date of Patent: Sep. 15, 1987

[54] OPTICAL APPARATUS

[75] Inventor: Richard V. Jeskey, Fiskdale, Mass.

[73] Assignee: Incom, Inc., Southbridge, Mass.

[21] Appl. No.: 520,152

[22] Filed: Aug. 4, 1983

Related U.S. Application Data

[63] Continuation-in-part of Ser. No. 442,512, Nov. 18, 1982, which is a continuation of Ser. No. 427,789, Sep. 29, 1982, abandoned.

[51] Int. Cl.⁴ .................................................. G02B 6/06
[52] U.S. Cl. ................................... 350/96.24; 350/96.10
[58] Field of Search ............... 350/96.10, 96.22, 96.24, 350/96.25, 96.27, 96.33

[56] References Cited

U.S. PATENT DOCUMENTS

| | | | |
|---|---|---|---|
| 2,825,260 | 3/1958 | O'Brien | 350/96.25 |
| 2,983,835 | 5/1961 | Frey | 313/475 |
| 3,469,026 | 9/1969 | Winik | 358/87 |
| 3,767,910 | 10/1973 | Harrigan | 240/13 X |
| 4,085,420 | 4/1978 | Stukenbrock | 358/56 |
| 4,116,739 | 9/1978 | Glenn | 156/169 |
| 4,123,137 | 10/1978 | Marcatili | 350/96.22 X |
| 4,272,156 | 6/1981 | Ishibashi et al. | 350/96.24 X |
| 4,279,465 | 7/1981 | Vojvodich | 350/96.33 X |
| 4,381,882 | 5/1983 | Sabine | 350/96.15 X |

FOREIGN PATENT DOCUMENTS 2028561 3/1980 United Kingdom ............ 350/96.24

OTHER PUBLICATIONS

Glenn, "A Fiber-Optic Magnifying Display Panel", S.I.D.: 83 Digest (1983) pp. 46–47.

Primary Examiner—William L. Sikes
Assistant Examiner—Akm E. Ullah
Attorney, Agent, or Firm—Blodgett & Blodgett

[57] ABSTRACT

Apparatus for expanding a visual image consisting of a ribbon of clad optical fibers locked in closely-spaced, parallel relationship and cut across at a narrow acute angle at one end, the surface thus exposed being roughened in texture and the exterior of each fiber being provided in that area with a reflective material. Alternately to roughening the surface, the core of each fiber is partially etched out, and a plug of light-diffusing material inserted. A reflective layer is applied between this plug and the cladding of the fiber.

8 Claims, 10 Drawing Figures

OPTICAL APPARATUS

CROSS-REFERENCE TO RELATED APPLICATIONS

This application is a continuation-in-part of patent application Ser. No. 442,512, filed Nov. 18, 1982, by the same inventor which was a continuation of Ser. No. 427,789, filed Sept. 29, 1982, now abandoned.

BACKGROUND OF THE INVENTION

In the recent past the perfection of the optical fiber as a means of transmitting light has brought about many innovations in the decorative and technical arts. From the very beginnings of the optical fiber industry, it has been recognized that the bundle of optical fibers presents an excellent method of magnifying or expanding images. By maintaining the fibers at one end of the cable in a close relationship to receive a small image and spreading the fibers at the other end to produce a large image, it is possible to magnify pictures of various kinds. Naturally, the light entering at the small end must be quite intense in order to obtain an image at the other end which is capable of being seen. However, a major problem is encountered in the fact that, in order that the image appear exactly the same at the large end as it was when it was received at the small end, the fibers must be spread in exactly the same pattern as exists at the small end. Although this can be accomplished manually, it is a very difficult operation to perform in a production setting. For instance, it has always been a desirable technical feat to magnify a television image; at the present time, this function is accomplished by the use of a projection lens. This means, however, that the input cathode-ray tube must produce a very intense image, because the amount of light that is generated is spread out over a large area and, therefore, becomes weaker. The use of an intense television image generates a large amount of heat, so that substantial cooling of the CRT and related equipment is necessary. In accomplishing the same function with optical fibers, the advantages are obvious. For one thing, the fibers can be arranged on a flat screen held against the wall. However, the problem is still one of arranging the output fibers in exactly the same pattern and arrangement as the input ends of the fibers; this has been a production feat that has been insolvable. Another major problem has been that the output end of the fibers, which generally has an interface with a low index-of-refraction medium, such as air, allows reflective and refractive interactions which do not promote the most efficient use of the input light for viewing. These and other difficulties experienced with the prior art devices have been obviated in a novel manner by the present invention.

It is, therefore, an outstanding object of the invention to provide optical apparatus that contains a plurality of optical fibers in which the input fiber arrangement and the output fiber arrangement are exactly the same, but the output fibers are spaced further apart.

Another object of this invention is the provision of optical apparatus for enlarging or expanding a visual image without distortion.

A further object of the present invention is the provision of a method of arranging optical fibers so that the input pattern and the output pattern are very accurately the same.

A still further object of the present invention is the provision of an image expanding apparatus which directs the major portion of the output light toward the viewer, with minimal reflective and refractive loss at the output end of the fibers.

It is another object of the instant invention to provide an optical image expander which is simple in construction, which is inexpensive to manufacture, and which is capable of a long life of useful service with a minimum of maintenance.

With these and other objects in view, as will be apparent to those skilled in the art, the invention resides in the combination of parts set forth in the specification and covered by the claims appended hereto.

SUMMARY OF THE INVENTION

In general, the invention consists of optical apparatus including a housing in which are mounted a first row of optical fibers arranged in an evenly-spaced row and a second row of optical fibers similar to the first row. Means is provided for maintaining the first ends of both rows in close, fixed proximity, while means is provided for maintaining the other ends of the rows in spaced parallel relationship. The ends of the fibers at the said other end of the rows are cut at a narrow angle to their centers to form broad emission surfaces. A spacer is located between rows to cause the spacing of the centroids of the face surfaces of the fibers at the said other end to be the same between adjacent rows as they are between adjacent fibers in the same row.

More specifically, the invention involves an optical apparatus consisting of an optical fiber of uniform cross section which is adapted to receive a light image at an input end and which has a cladding layer applied to its outer surface. A reflective layer is provided near the exit end of the fiber, the fiber being cut at a narrow angle to the centroid to expose an emission surface which is substantially greater than the cross section, the emission surface being provided with light diffusing means.

In addition, the invention involves a method of forming optical apparatus consisting of the steps of: depositing an opaque reflective layer on the emission end of a plurality of clad optical fibers, forming a row of such optical fibers in which the centers of the fibers are evenly spaced and lie in a flat plane, the step of cutting the row at an acute angle, thereby exposing emission surfaces that are substantially greater than the cross section of the fibers, and then roughening the said surfaces.

In an alternative embodiment, each fiber is formed with an etchable core and a durable cladding; a portion of the core is completely etched from the cut end after the cutting step. The resulting cavity is filled with a plug of light-diffusing material. An inner reflective layer may be interposed between the remaining cladding and the diffusing plug.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
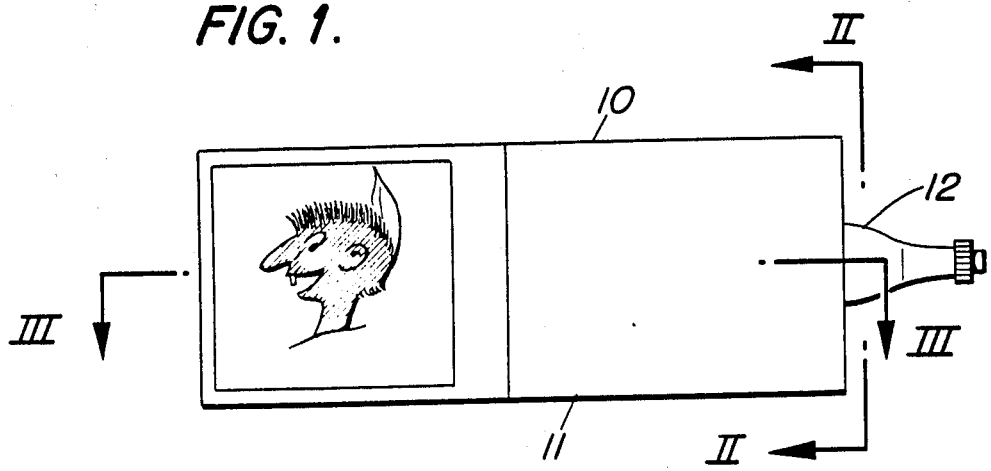
FIG. 1 is a front elevational view of an optical apparatus embodying the principles of the present invention.
Figure 2:
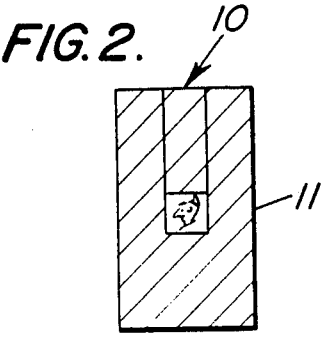
FIG. 2 is a transverse sectional view of the apparatus taken on the line II—II of FIG. 1.
Figure 3:
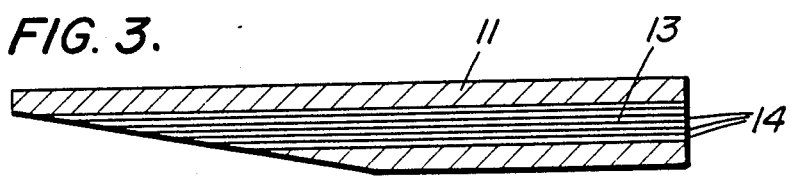
FIG. 3 is a longitudinal sectional view of the apparatus taken on the line III—III of FIG. 1.

Referring first to FIG. 1, wherein are best shown the general features of the invention, the optical apparatus, indicated generally by the reference numeral 10, is shown as consisting of an elongated housing 11, one end of which is attached to an image generator 12, such as a television tube. The image appearing on the tube is relatively small (as shown in FIG. 2) and is enlarged to a larger size as shown in FIG. 1. The transmission from the small image at end to the large image at the other end takes place through a bundle of optical fibers. In the preferred embodiment, the scanning lines would be around 500 in each direction, giving a total of around 250,000 fibers. As is evident in FIG. 3, the bundle of optical fibers is made up of a large number of layers, each layer being in the form of a ribbon in which the fibers are locked together with a cement, such as an epoxy.

Figure 4:
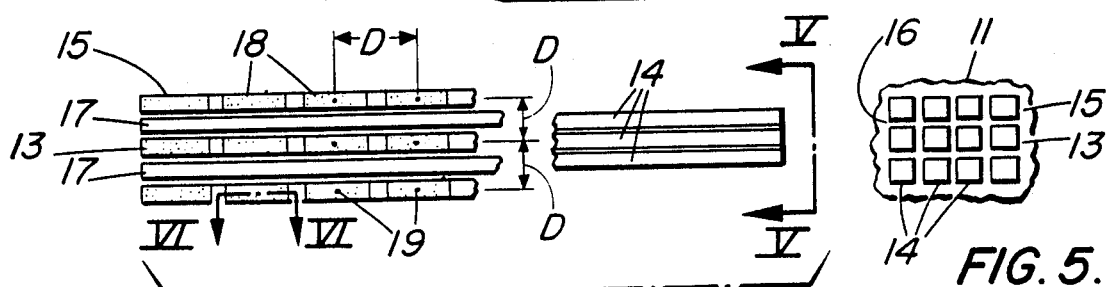
FIG. 4 is an enlarged front elevational view of a portion of the apparatus.
Figure 5:
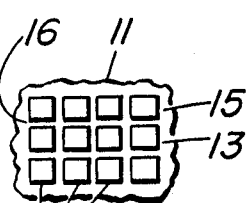
FIG. 5 is a side elevational view of a portion of the apparatus taken on the line V—V of FIG. 4.

Referring next to FIGS. 4 and 5, a first row 13 of optical fibers 14 is mounted in the housing 11. A second row 15 of fibers 14 similar to the first row is also mounted in the housing. The two rows 13 and 15 are cemented together at the first ends adjacent the generator 12 in close, fixed proximity. The other ends of the rows 13 and 15 are held in spaced, parallel relationship by wedges or spacers 17. The ends of the fibers at the said other ends of the rows are cut at a narrow angle to their centers to form braod emission surfaces 18, whose centroids are indicated by the reference numeral 19. It can be seen that the fibers in each row 13 and 15 are illustrative of other rows in the apparatus and all these rows are arranged with their centers in a flat plane. The spacers 17 which are located between the rows act to bring about spacing of the centers of the face surfaces 18 at the said other end to be the same between adjacent rows as they are between adjacent fibers in the same row.

Figure 6:
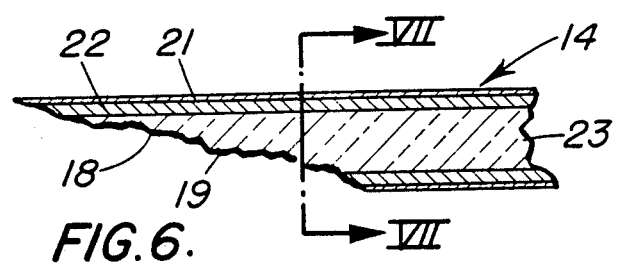
FIG. 6 is a longitudinal horizontal sectional view of an optical fiber forming part of the apparatus.
Figure 7:
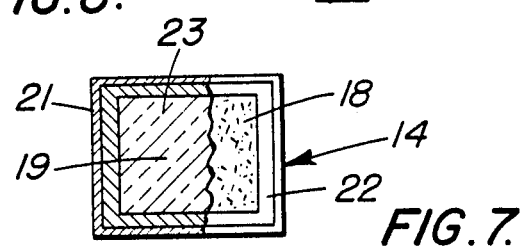
FIG. 7 is a transverse sectional view of the fiber taken on the line VII—VII of FIG. 6, FIGS. 8 and 9 are longitudinal sectional views of alternative structures for the emission end of an optical fiber forming part of the apparatus.

FIGS. 6 and 7 show a single fiber at the output end of the apparatus. The surface 19 that is formed by the cut at the other end of each fiber is provided with a rough texture and the outer surface of the fiber 14 in the vicinity of the cut is coated with reflective material 21. As is obvious in FIGS. 6 and 7, the optical fiber 14 has a uniform cross-section which, in the preferred embodiment, is square and is adapted to receive a light image at the input end from the generator 12. A cladding layer 22 lies over the outer surface of the core 23 of the fiber, while the reflective layer 21 is carried over the cladding layer. The cutting of the entire body and fibers produces a cut of a narrow angle to the centroid at the exit end of the fiber to expose the surface 19 with an area much greater than the cross-section and, of course, the surface is roughened. The surface exposed is rectangular where the fiber has a square cross-section.

Each fiber 14 consists of a core 23 of relatively high index of refraction. The cladding layer 22 has a relatively low index of refraction and the outer reflective layer 21 in the preferred embodiment consists of aluminum applied by the vacuum vapor deposition process. The fibers in a given row 13 are molded in a solid ribbon of polymer in closely adjacent relationship, as is obvious in FIG. 5. Ribbons are held together in contacting layers from the input end through most of its length and the spacers 17 are placed between adjacent ribbons to hold the centers of the fibers at the same spacing in the vertical direction as in the lateral direction. For instance, in FIG. 4, the centers 19 of the surfaces 18 are spaced at a distance "D" in the vertical direction and are spaced the distance "D" in side-by-side relationship within the rows.

A method of forming the optical apparatus 10 consists of the steps of forming rows 13 and 15 of the optical fibers 14 in which the centers 19 of the fibers are evenly spaced and lie in a flat plane. One then cuts the row at the acute angle indicated in FIG. 3, thereby exposing the broad surfaces 18 that are substantially greater in size than the cross-section of the fibers. The surfaces 18 are then roughened by grinding or sand-blasting. Each fiber 14 is provided with a cladding layer 22 and a reflective layer 21 in the vicinity of the surfaces 18.

Figure 8:
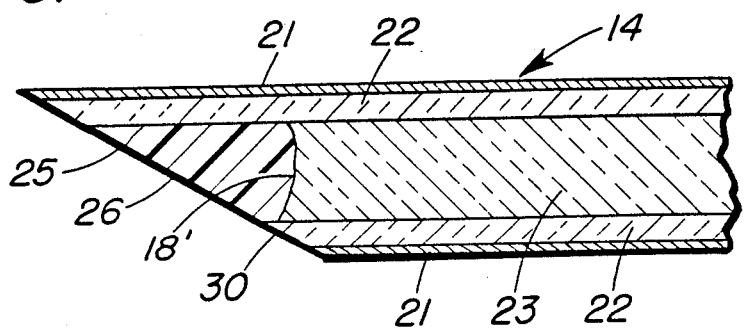

A number of alternative structures may embody elements of the present invention. For example, instead of simply roughening the obliquely cut face of each fiber, a certain amount of the core may be etched from this end, for example by the use of acid. The cavity which is formed may be filled with a translucent, light-diffusive material, such as diffusing epoxy. As shown in FIG. 8, the core 23 of this embodiment has been etched out to a point where the new emission surface 18' of the core is slightly beyond the point where the cladding layer 22 and the layer of reflective material 21 still radially surround the core. The etched out core material is replaced by a plug 25 of light-diffusing material with a broad emission surface 26. The etching may be achieved by forming the fiber with, for example, a borosilicate cladding layer, an acid-resistant reflective layer, and a core which is etchable by such materials as nitric acid.

Figure 9:
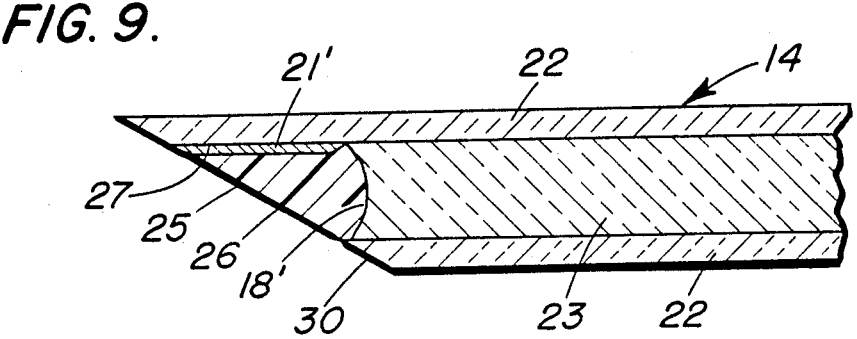

As a further alternative, FIG. 9 shows the provision of a layer 21' of reflective material on the inner surface 27 of the etched cavity. The reflective layer is, of course, not applied on the new emission surface 18' of the core. This latter structure may be formed in the following manner:

The fiber may be clad, as above, with an acid resistant material such as borosilicate glass, while the core is formed of etchable glass. In this embodiment the outer reflective layer may be omitted. The core is completely etched out of the cut end and etched out a small distance into the intact fiber cladding. This leaves a lip 30 around the new emission surface 18' of the core. A reflective layer 21' is flashed onto the inner surface 27 of the cladding around the cavity, by a method such as vapor deposition of aluminum. The reflective layer is flashed on from a direction such that the lip 30 shields or "shadows" the new surface 18' of the core and prevents obstruction of this surface by the reflective material. Again, a plug 25 of diffusing material, such as diffusing epoxy, is used to fill the cavity and provide a new broad emission surface 26.

Figure 10:
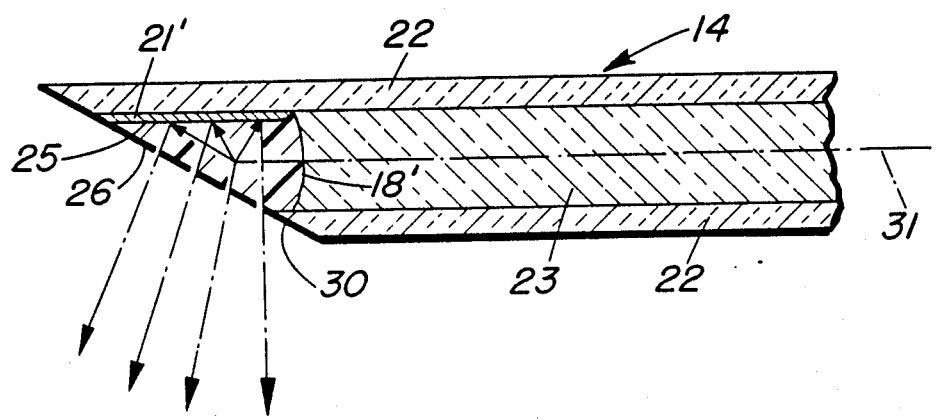
FIG. 10 illustrates the light-directing activity of the embodiment of the present invention shown in FIG. 9.

The operation and advantages of the invention will now be readily understood in view of the above discussion. When the visual image generator 18 is actuated, a small image shown in FIG. 2 is located adjacent the small end of the fibers. The light travels through the fibers and emerges at the other end on the surfaces 18. Because of the reflective layer 21 and the roughened nature of the surface 18, the light emerges over the entire surface in a diffused manner, thus glowing over the entire surface, and mainly directed toward the viewer. This operation may be enhanced by the use of the diffusing plug as illustrated in FIG. 10, where a quantity of light 31 is partly diffused outward. A large portion of the remainder is reflected outward by the reflective layer 21'. Naturally, the intensity of the illumination is reduced in inverse proportion to the relative sizes of the surfaces 18 or 26 as compared to the size of the cross-section of the fiber at the input end adjacent the generator 12 where the light is admitted.

In a practical version of the invention, the fiber 14 was selected with a circular cross-section and formed of glass with an index of refraction of 1.62. While the fiber was 0.004 inches in diameter, the core itself had a diameter of 0.0038 inches. A cladding layer 22 of glass with an index of refraction of 1.48 was applied to the layer in a thickness of 0.0001 with a total dimension added to the core of 0.0002 inches. The glass in the cladding was a borosilicate glass, while the core was a lead glass. The reflective layer 21 was aluminized, that is to say, aluminum applied by the vapor system of deposition. The face angle was 11°, thus giving a five-to-one amplification or image expansion. The spacing dimension D was 0.016 inches. This would be the size of the spacer 17 and would bring the center to center dimension D to 0.020 inches. In the case of this form of the invention, the fiber was round, thus giving a face surface 18 an oval shape.

It can be seen that the chief advantage of the present method of expanding a visual image is that the apparatus can be formed by the use of ordinary production methods. When desired, the manufacturer of the individual ribbons with their layering and expanding by use of spacers 17 can take place on automatic machinery or with unskilled labor. Input to the device can be anyone of a number of visual image generating devices, such as a plasma display, a liquid crystal, a light emitting diode, a cathode-ray tube, or a vacuum fluorescent tube.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. An optical apparatus for receiving an optical image at a first end and for producing an expanded form of the optical image at a second end, comprising:
    a plurality of optical fibers of uniform cross-section extending from said first end to said second end, each fiber having a core and cladding and an axis in the neighborhood of the second end, each fiber adapted to transmit light from the first end to the second end,
    the fibers formed into a plurality of rows, the fibers in a given row being held in a uniformly adjacent configuration,
    the several rows being held in close proximity at the first end and separated by spacers at the second end,
    all the rows of the fibers together being cut at the second end at a narrow angle to their axes to provide a broad emission surface at the end of each fiber, the surfaces being co-planar with each other to form an expanded image plane, each surface having a center, the widths of the spacers being such as to make the center-to-center distance between the adjacent rows at the second end the same as the distance between the centers of the faces of the adjacent fibers on the same row, so that the image at the second end is and undistorted form of the image at the first end, each of the fibers at its second end being provided with light diffusing element integrally formed at the fiber end to disperse light from the second end and providing a non-directional field of view for the expanded image.

2. Optical apparatus as recited in claim 1, wherein each of the said fibers comprises a core and a cladding having an outer surface, each of said light diffusing elements comprising a portion of the core at the output end of each fiber at said output end of said row which portion is formed of a plug of translucent, light-diffusing material, each fiber being further provided with a reflective layer around said plug.

3. Optical apparatus as recited in claim 2, wherein said reflective layer is provided on the outer surface of the cladding of each fiber.

4. Optical apparatus as recited in claim 2, wherein said reflective layer is provided between said plug and said cladding.

5. Optical apparatus as recited in claim 2, wherein a light image generator is mounted adjacent the said input end of the fibers.

6. Method of forming optical apparatus for receiving an optical image at a first end and for producing an expanded form of the optical image at a second end, comprising the steps of:
    (a) forming a row of optical fibers each fiber having a core and a cladding and an outside surface, each fiber having an input end and an output end and a uniform cross-section,
    (b) cutting the row at the output ends of the fibers at an acute angle, thereby exposing emission surfaces that are substantially greater than the cross-section of the fibers,
    (c) etching-out a portion of the core at each output end to form a cavity having an inner surface and a new emission surface on the core, and
    (d) replacing the etched-out portion with a plug of light diffusing material to form a new broad output surface.

7. Method as recited in claim 6 further comprising the step of applying a reflective layer on the outside surface of each fiber around said outside end.

8. Method as recited in claim 6, further comprising the step of, before replacing said etched-out portion with said diffusing plug, applying a reflective layer on the inner surface of said cavity, without applying the reflective layer on the said new emission surface on the core.

* * * * *